United States Patent
Weller et al.

(10) Patent No.: US 6,266,399 B1
(45) Date of Patent: Jul. 24, 2001

(54) OUTGOING MESSAGE SELECTION BASED ON CALLER IDENTIFICATION AND TIME/DATE CONSTRAINTS

(76) Inventors: Douglas L. Weller, 431 Magnolia La., Santa Clara, CA (US) 95051-5637; Richard L. Morgan, 1312 Poe La., San Jose, CA (US) 95130

( * ) Notice: Subject to any disclaimer, the term of this patent is extended or adjusted under 35 U.S.C. 154(b) by 0 days.

(21) Appl. No.: 09/022,514

(22) Filed: Feb. 12, 1998

(51) Int. Cl.[7] .................................................. H04M 1/64
(52) U.S. Cl. ......................... 379/88.19; 379/88.04; 379/142
(58) Field of Search ........................ 379/67.1, 88.01, 379/88.02, 88.03, 88.04, 88.19, 88.2, 88.21, 88.22, 142

(56) References Cited

U.S. PATENT DOCUMENTS

| | | | | |
|---|---|---|---|---|
| 4,850,005 | * | 7/1989 | Hashimoto | 379/88 |
| 4,985,913 | * | 1/1991 | Shalom et al. | 379/76 |
| 5,276,731 | * | 1/1994 | Arbel et al. | 379/88 |
| 5,434,908 | * | 7/1995 | Klein | 379/88 |
| 5,555,291 | * | 9/1996 | Inniss et al. | 379/67 |
| 5,729,593 | * | 3/1998 | Baker et al. | 379/67 |
| 5,832,062 | * | 11/1998 | Drake | 379/88 |
| 5,862,209 | * | 1/1999 | Kapsales | 379/214 |
| 6,035,018 | * | 3/2000 | Kaufman | 379/88.17 |
| 6,052,438 | * | 4/2000 | Wu et al. | 379/67.1 |

* cited by examiner

Primary Examiner—Scott L. Weaver
(74) Attorney, Agent, or Firm—Douglas L. Weller

(57) ABSTRACT

In order to increase the versatility with which incoming phone calls, are handled, a plurality of outgoing messages are stored. A first caller identification is associated with a first outgoing message from the plurality of outgoing messages. Upon receipt of a call from a caller, passive identification of the caller is performed in order to determine if an identity of the caller matches the first caller identification. If an identity of the caller matches the first caller identification, the first outgoing message is played to the caller. If in an identity of the caller does not match the first caller identification, an outgoing message other than the first outgoing message is played to the caller.

14 Claims, 6 Drawing Sheets

MESSAGE NUMBER: #1 ▽    NEW: ◉ ~82    DELETE: ◉ ~99

81

LINKED OUTGOING CONDITIONS: #2 ▽    NEW: ◉ ~100    DELETE: ◉ ~101

97

CALLER ID/TIME/DATE:

NOT (JUN 01 - AUG 31) & M-F & 1700-0800

83

BOOLEAN FUNCTIONS:

AND (&) ~84

OR (+) ~85

NOT (N) ~86

( ~87    ) ~88

98

VOICE FILES: DOUG ▽ ~89

CALLER ID: NEW ▽ ~90

MONTH: JAN ▽ ~91    DAY: 01 ▽ ~94

DAY: MON ▽ ~92    YEAR: 1998 ▽ ~95

HOUR: 0000 ▽ ~93    MINUTE: 00 ▽ ~96

FIGURE 6    80

OUTGOING MESSAGE SELECTION BASED ON CALLER IDENTIFICATION AND TIME/DATE CONSTRAINTS

BACKGROUND

The present invention concerns answering machine/voice mail technology and pertains particularly to outgoing message selection based on caller identification and time/date constraints.

The use of answering machines, and more recently voice mail has added a great amount of convenience to the problem of making connections between parties via telephone.

Typically, an answering machine or voice mail system provides an outgoing message to a caller. A caller confronted by an answering machine or voice mail outgoing message can choose to leave a message, call back at a later time and/or seek some other method of communication.

If there are multiple users of a single phone line, more sophisticated voice mail systems may allow for a caller to select a voice mail box for a particular user. The caller accessing such a voice mail box may hear an outgoing message for the voice mail box.

SUMMARY OF THE INVENTION

In accordance with the preferred embodiment of the present invention, incoming phone calls, are handled. A plurality of outgoing messages are stored. A first caller identification is associated with a first outgoing message from the plurality of outgoing messages. Upon receipt of a call from a caller, passive identification of the caller is performed in order to determine if an identity of the caller matches the first caller identification. If an identity of the caller matches the first caller identification, the first outgoing message is played to the caller. If an identity of the caller does not match the first caller identification, an outgoing message other than the first outgoing message is played to the caller.

For example, the first caller identification is a phone number from a source of the call (caller ID). Alternatively, the first caller identification comprises a voice print from a first potential caller.

Additionally a first time/date constraint can be associated with a second outgoing message from the plurality of outgoing messages. Upon receipt of the call from the caller, it is determined whether a time/date of the call matches the first time/date constraint. If the identity of the caller does not match the first caller identification and the time/date of the call matches the first time/date constraint, the second outgoing message is played to the caller. If the identity of the caller does not match the first caller identification and the time/date of the call does not match the first time/date constraint, an outgoing message other than the first outgoing message and other than the second outgoing message is played to the caller. The first time/date constraint is, for example, at least one of the following constraints: an indication of year; an indication of month; an indication of day of the month; an indication of day of the week; an indication of hours; and, an indication of minutes.

The present invention provides for versatility based on the identity of callers and on the time/date at which a call is received.

DESCRIPTION OF THE PREFERRED EMBODIMENT

Figure 1:
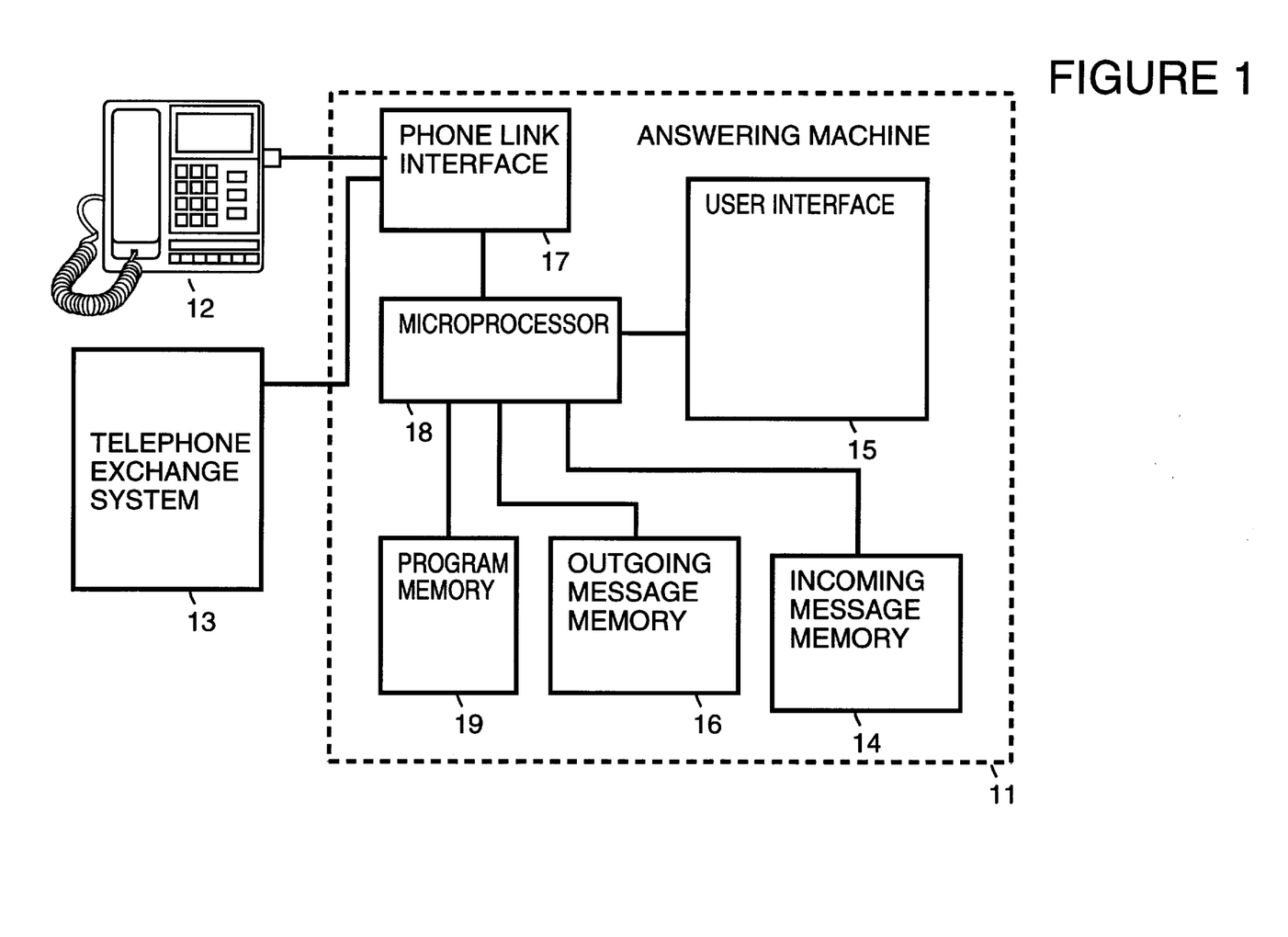
FIG. 1 is a simplified block diagram of an answering machine/voice mail system in accordance with a preferred embodiment of the present invention.

FIG. 1 is a simplified block diagram of an answering machine/voice mail system 11. Answering machine/voice mail system 11 includes a phone link interface 17, a microprocessor 18, a program memory 19, an outgoing message memory 16, an incoming message memory 14 and a user interface 15.

Phone link interface 17 provides a standard two wire (one phone line) or four wire (two phone line) interface to a phone 12 and to a telephone exchange system 13. For a larger voice mail system, phone link interface may provide an interface for additional telephone lines. Alternatively, phone link interface 17 can be a wireless interface, coax cable, fiberoptic cable or some other medium capable of transferring data.

Telephone exchange system 13 is, for example, a public telephone exchange or alternatively a private branch exchange (PBX). Telephone 12 is, for example, a commercially available one or two line phone.

Answering machine/voice mail system 11 is implemented, for example, within a personal computing system. In this case, microprocessor 18 is, for example, a Pentium processor available from Intel Corporation, having a business address of 2200 Mission College Boulevard, Santa Clara, Calif. 95050. While in FIG. 1, program memory 19, outgoing message memory 16 and incoming message memory 14 are shown using separate blocks, when answering machine/voice mail system 11 is implemented within a personal computing system, program memory 19, outgoing message memory 16 and incoming message memory 14 are implemented, for example, as separate memory areas within random access memory for the personal computing system and/or within hard drive storage.

Also, when answering machine/voice mail system 11 is implemented within a personal computing system, phone link interface is, for example a modem, such as those available from U.S. Robotics Corporation. User interface 15 is implemented using a keyboard, mouse, computer display, sound card and associated software, as described more fully below.

While one preferred embodiment of the present invention is implemented using a personal computing system, other embodiments also exist. For example, in another preferred embodiment of the present invention, answering machine/ voice mail system 11 is implemented as a stand-alone answering machine. Operation and construction of answering machine/voice mail system 11 in this case is the same with only minor differences. For example, while in FIG. 1, program memory 19, outgoing message memory 16 and incoming message memory 14 are shown using separate blocks, when answering machine/voice mail system 11 is implemented as a stand-alone answering machine, program memory 19, outgoing message memory 16 and incoming message memory 14 are still implemented, for example, as separate memory areas within random access memory for the answering machine. However, when answering machine/ voice mail system 11 is implemented as a stand-alone answering machine hard drive storage is generally omitted. Use of RAM or some other volatile or non-volatile memory substitute provides a sufficient amount of memory. However, hard drive storage or even CD storage can be added if needed, for example when using voice pattern matching or video pattern matching for identifying a caller.

Additionally, in FIG. 1, answering machine/voice mail system 11 is shown interacting with telephone exchange system 13. However, in other embodiments of the present invention, answering machine/voice mail system 11 is implemented within telephone exchange system 13, whether telephone exchange system 13 is a public telephone exchange or a private branch exchange (PBX).

Figure 2:
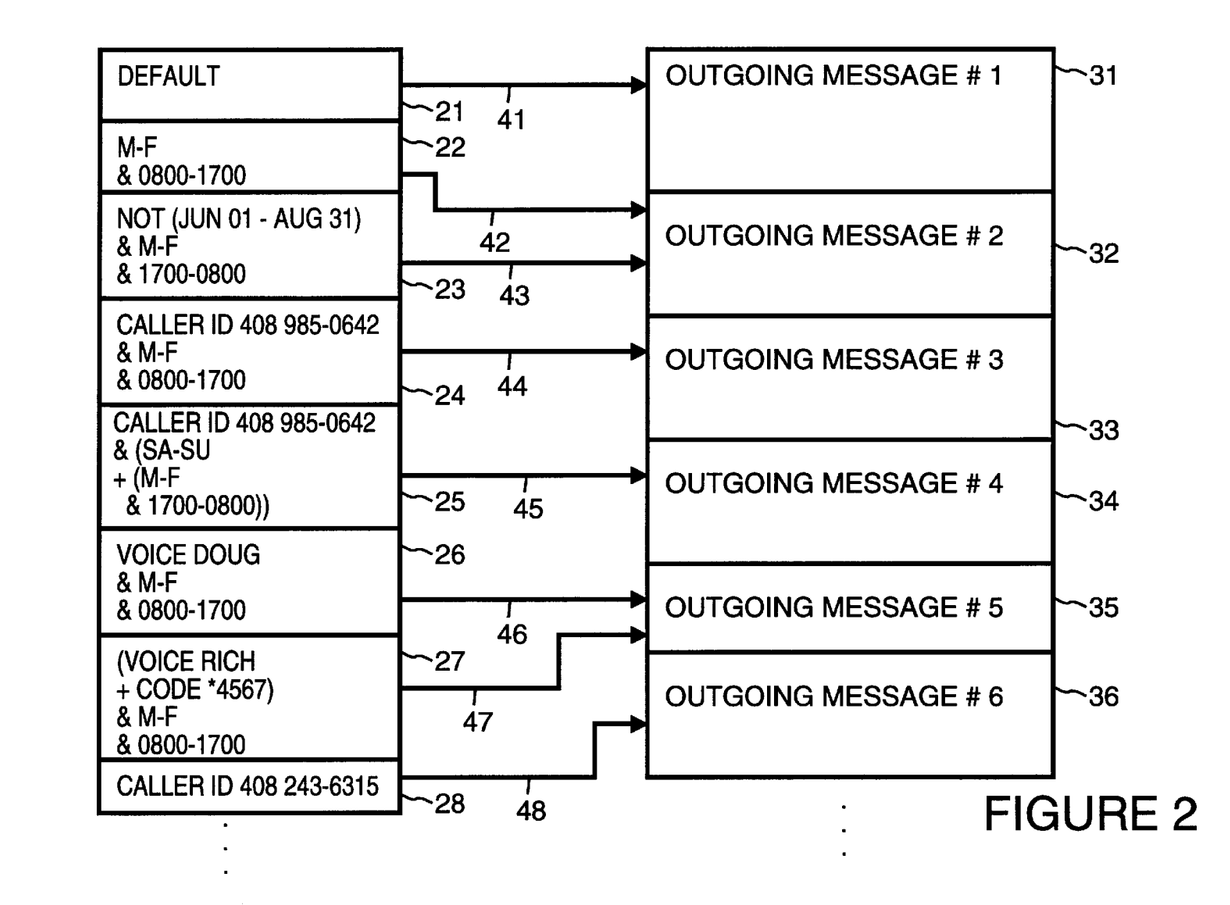
FIG. 2 shows organization of a memory which is used to select an outgoing message based on caller identification and/or time/date in accordance with a preferred embodiment of the present invention.

FIG. 2 shows organization of a portion of outgoing message memory 16 in accordance with a preferred embodiment of the present invention.

In outgoing message memory 16, six outgoing messages are shown. Specifically, an outgoing message (#1) 31, an outgoing message (#2) 32, an outgoing message (#3) 33, an outgoing message (#4) 34, an outgoing message (#5) 35 and an outgoing message (#6) 36 are shown. Additional (or fewer) outgoing messages may be utilized as determined by a user of answering machine/voice mail system 11.

Outgoing conditions are used to indicate under what circumstances particular outgoing messages are to be used. An outgoing condition 21 indicates via pointer 41 that outgoing message 31 is to be utilized when no other criteria (caller identification or time/date indication) matches.

An outgoing condition 22 indicates via pointer 42 that outgoing message 32 is to be utilized when (provided there is no caller identification match) a caller calls between 8 AM and 5 PM.

An outgoing condition 23 indicates via pointer 43 that outgoing message 32 is to be utilized (provided there is no caller identification match) when it is not Summer months (June 1–August 31) and the caller calls before 8 AM or after 5 PM.

An outgoing condition 24 indicates via pointer 44 that outgoing message 33 is to be utilized when caller ID indicates that the caller is dialing from 408 985-0642 and the call is received on Monday through Friday between 8 AM and 5 PM.

An outgoing condition 25 indicates via pointer 45 that outgoing message 34 is to be utilized when caller ID indicates that the caller is dialing from 408 985-0642 and the call is received either on Saturday or Sunday, or on Monday through Friday before 8 AM or after 5 PM.

An outgoing condition 26 indicates via pointer 46 that outgoing message 35 is to be utilized when a voice match indicates that the caller's voice matches the voice print labeled "Doug" (as stored within answering machine/voice mail system 11) and the call is received on Monday through Friday between 8 AM and 5 PM.

An outgoing condition 27 indicates via pointer 47 that outgoing message 35 is to be utilized when a voice match indicates that the caller's voice matches the voice print labeled "Doug" (as stored within answering machine/voice mail system 11) or the caller presses in on the digits "*4567, and in addition the call is received on Monday through Friday between 8 AM and 5 PM.

An outgoing condition 28 indicates via pointer 48 that outgoing message 36 is to be utilized when caller ID indicates that the caller is dialing from 408 243-6315.

Figure 3:
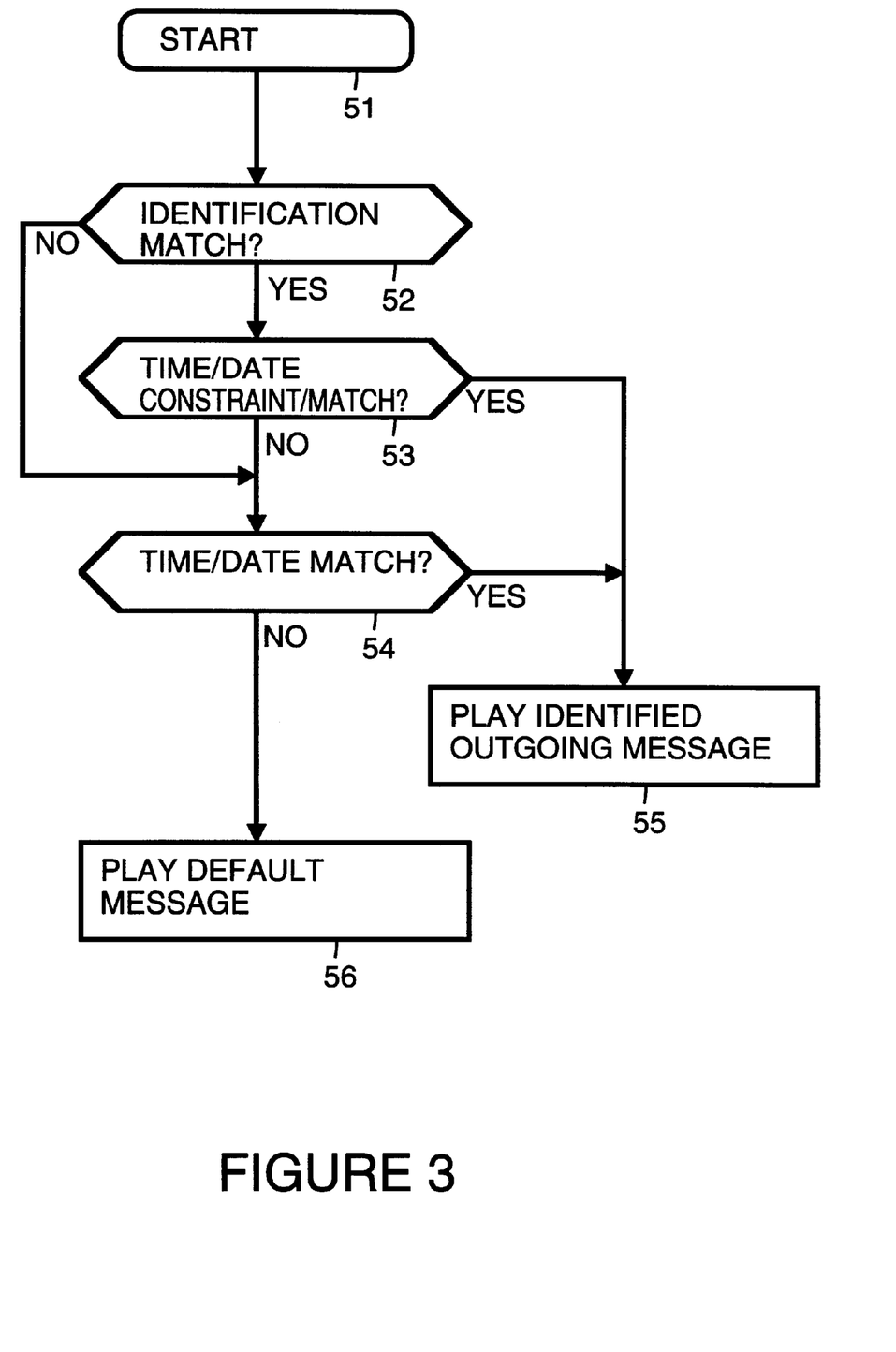
FIG. 3 is a simplified flowchart which illustrates logic to select an outgoing message for an answering machine/voice mail system in accordance with a preferred embodiment of the present invention.

FIG. 3 is a simplified flowchart which illustrates logic to select an outgoing message for answering machine/voice mail system 11. In a step 51, the routine starts when a call is received. In a step 52 a check is made to see if there is a caller identification match. For example, the caller identification match is the phone number from which the call originates (caller ID) such as in outgoing condition 24, outgoing condition 25 and outgoing condition 28 (shown in FIG. 2).

Alternatively other schemes may be used for passive recognition of the caller. For example, a caller can be invited to speak and the voice of the caller may be compared to stored voice prints to see if a match is generated. This is illustrated by outgoing condition 26 and outgoing condition 27 (shown in FIG. 2). Because of constraints of current voice recognition software, voice matching is facilitated by storing a voice print which uses a phrase such as "Hello, this is Doug" in order to allow more accurate matching of a stored voice print to a caller's voice.

Other passive caller identification techniques can be used. For example, although currently extremely resource intensive, video matching is used when a caller calls using a video conferencing system. In the preferred embodiment, active caller identification also can be used. For example, as illustrated by outgoing condition 27 (shown in FIG. 2), a caller can identify himself by punching in on a keyboard a predefined code. This can be useful, for example, as a back up when passive caller identification fails to accurately identify a caller.

If in step 52, an identification match is made, in a step 53 a check is made to see if there is any time/date constraints which need to be evaluated. When there is no time/date constraint listed, as for example illustrated by outgoing condition 28 (shown in FIG. 2), the time/date constraint is considered met (i.e., there is a time/date match).

When there is a time/date constraint listed, as for example illustrated by outgoing condition 23, outgoing condition 24, outgoing condition 25, outgoing condition 26 and outgoing condition 27 (shown in FIG. 2), the time/date constraint is considered met when the call is within the listed time/date constraint. The time/date constraint may include an indication of time of day, day of the week, month, day of the month, or year. A clock and calendar feature within answering machine/voice mail system 11 is used to determine the time/date of the call.

If in step 53 there is a time/date match, in a step 55, the identified outgoing message is played. If a message is to be recorded from the caller the message is then recorded by answering machine/voice mail system 11. Typically, all the message will be recorded into the same incoming voice mail box, since the outgoing messages are distinguished by caller, but are assumed to be for the same party. However, if desired, a separate voice mail box may be set up for particular outgoing messages.

If in step 52, an identification match is not made, or in step 53 there is a time/date (chronology) constraint listed which is not matched, in a step 54, a check is made of outgoing conditions which have time/date constraints only (i.e., there is no caller identification constraints) to see if there is a match with the current time/date. For example, outgoing condition 22 and outgoing condition 23 shown in FIG. 2 both have time/date constraints but do not have caller identification constraints.

If in step 54 there is a time/date match, in step 55, the identified outgoing message is played. If a message from the caller is to be recorded the message is then recorded by answering machine/voice mail system 11. Typically, all the message will be recorded into the same incoming voice mail box, since the outgoing messages are distinguished by caller, but are assumed to be for the same party. However, if desired, a separate voice mail box may be set up for particular outgoing messages.

Figure 4:
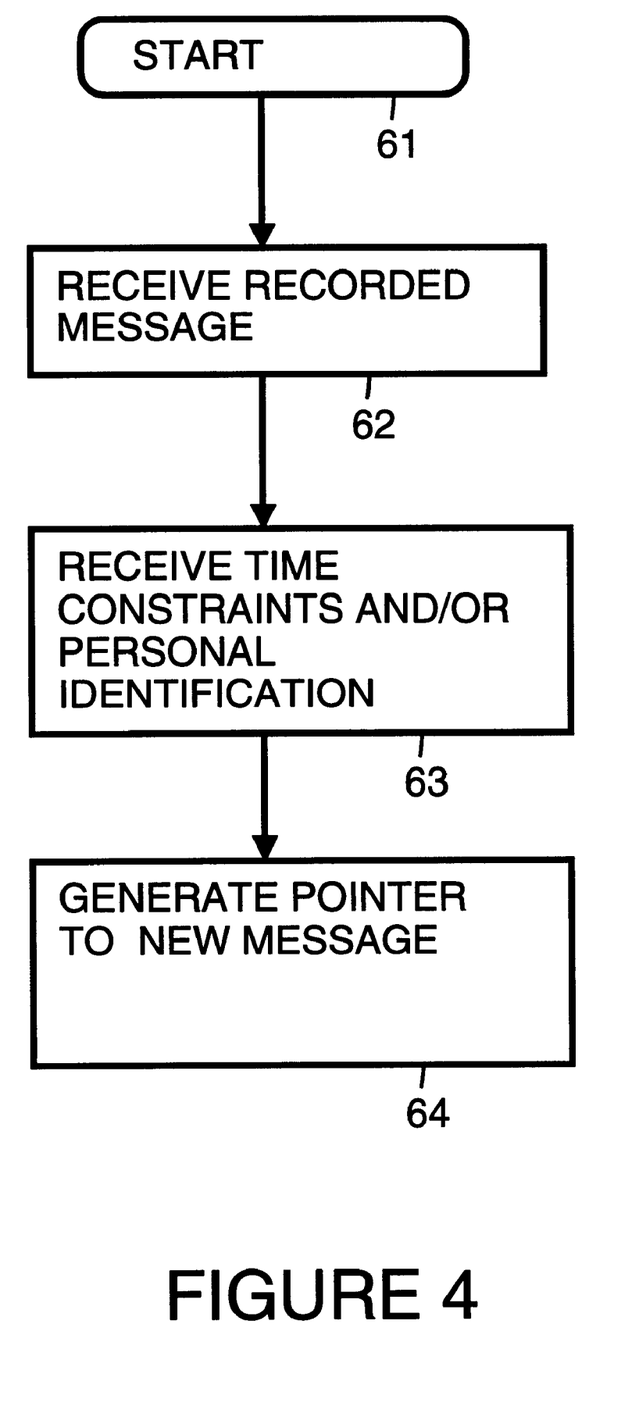
FIG. 4 is a simplified flowchart which illustrates generation of an outgoing message and associating the outgoing message with a time constraint and/or personal identification in accordance with a preferred embodiment of the present invention.

FIG. 4 is a simplified flowchart which illustrates generation of an outgoing message and associating the outgoing message with a time constraint and/or personal identification in accordance with a preferred embodiment of the present invention. In a step 61, the process is started. For example, when answering machine/voice mail system 11 is a personal computing system, this is accomplished by launching an outgoing message application.

In a step 62, an outgoing message is recorded. In a step 63, time/date constraints and/or personal identification are linked to the outgoing message. In a step 64, a pointer to the new message is generated, as shown in FIG. 2.

Figure 5:
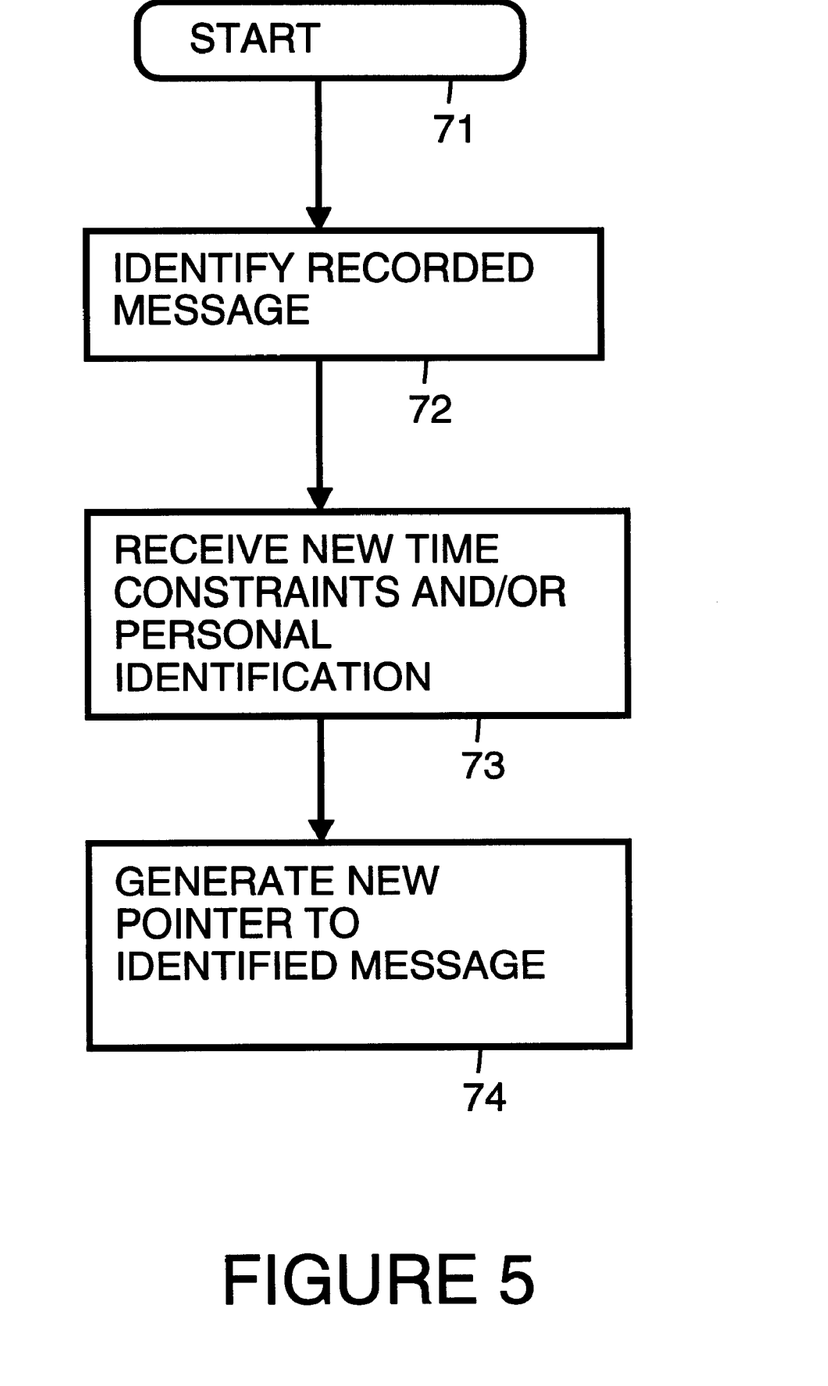
FIG. 5 is a simplified flowchart which illustrates association of an outgoing message with a time constraint and/or personal identification in accordance with a preferred embodiment of the present invention.

FIG. 5 is a simplified flowchart which illustrates associating an outgoing message with an additional time constraint and/or and additional personal identification in accordance with a preferred embodiment of the present invention. In a step 71, the process is started. For example, when answering machine/voice mail system 11 is a personal computing system, this is accomplished by launching an outgoing message application.

In a step 72, an outgoing message is identified. In a step 73, time/date constraints and/or personal identification are linked to the outgoing message. In a step 74, a pointer to the new message is generated, as shown in FIG. 2.

Figure 6:
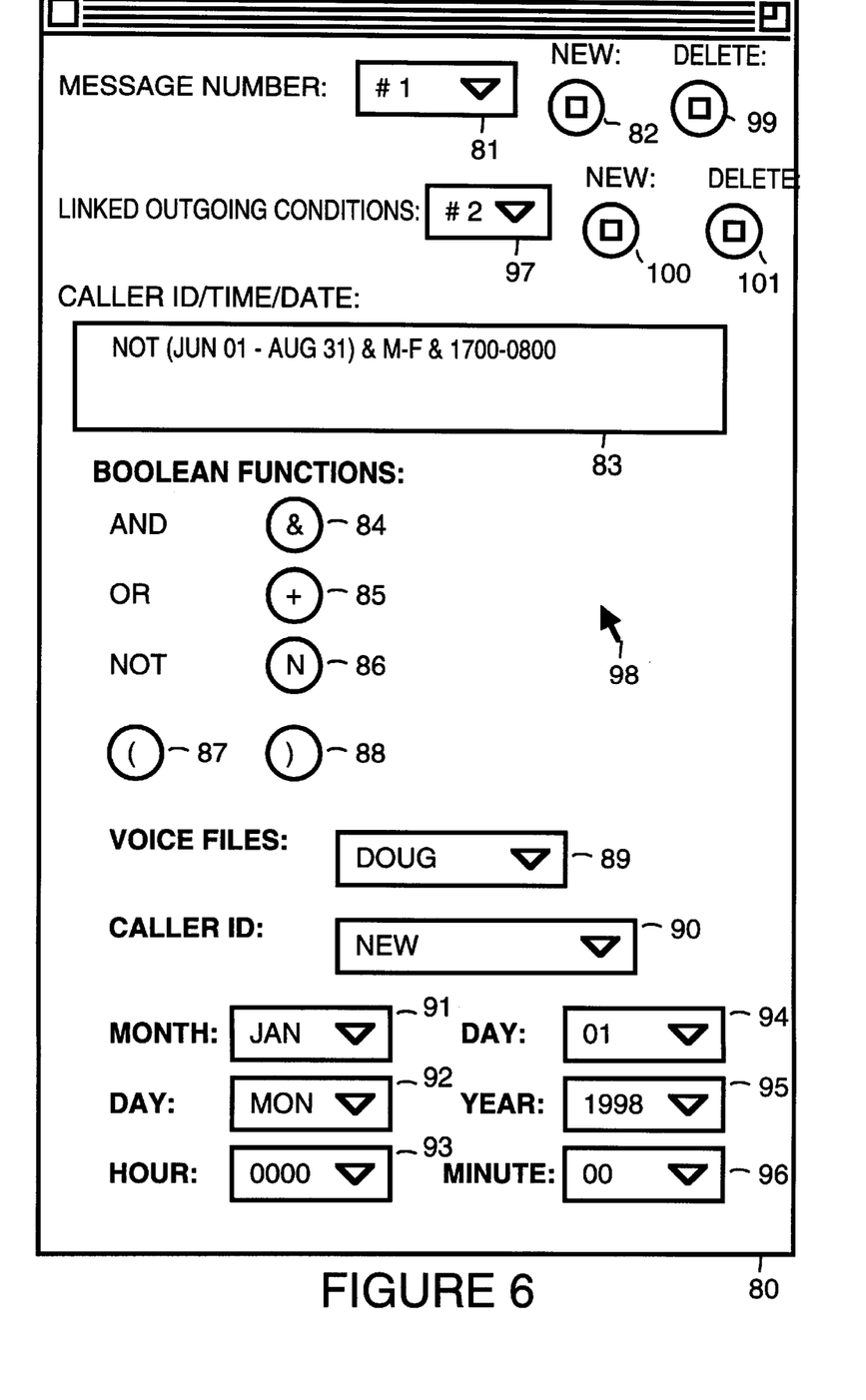
FIG. 6 is an example of a dialog box used to enter in outgoing conditions in accordance with a preferred embodiment of the present invention.

FIG. 6 shows an interface 80 used to link time/date constraints and/or personal identification to an outgoing message. Using a cursor 98, a user can select an already recorded outgoing message by clicking on pull-down menu 81 and selecting the desired outgoing message. Once a message is selected, the audio for the message is played back for the message, and the message number remains displayed within the top of pull-down menu 81. A new message is recorded by depressing button 82 and recording the new message. A selected message is deleted by using cursor 98 to click on a button 99.

Using cursor 98, a user can select an existing linked outgoing conditions linked to the selected outgoing message (selected in pull-down menu 81) by clicking on pull-down menu 97 and selecting the desired outgoing condition. Once an outgoing condition is selected, a number for the outgoing condition remains displayed within the top of pull-down menu 97. Additionally, the text for the outgoing condition appears in a box 83. A new outgoing condition for the selected message may be made by selecting a new button 100 and typing in the condition within box 83. A selected outgoing condition is deleted by using cursor 98 to click on a button 101.

A user can use a keyboard to type in and edit outgoing conditions set out within box 83. Alternately, the user can use cursor 98 to select Boolean functions, which are then placed into the selected position within box 83. For example, a button 84 is selected for placement of the logic AND function, a button 85 is selected for placement of the logic OR function, and/or a button 86 is selected for placement of the logic NOT function. In addition, a button 87 is used to generate a left parenthesis and a button 88 is used to generate a right parenthesis.

A pull down menu 89 is used by a user to select an existing voice file. A pull down menu 90 is used to select an existing caller ID number or to generate a new caller ID number for placement in box 83 and storage within pull-down menu 90. A pull down menu 91 is used to select a day of the week. A pull down menu 92 is used to select a month. A pull down menu 93 is used to select an our. A pull down menu 94 is used to select a day of the month. A pull down menu 95 is used to select a year. A pull down menu 96 is used to select a minute.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for handling incoming phone calls, comprising the following steps:

(a) storing a plurality of outgoing messages;

(b) associating a first date constraint with a first outgoing message from the plurality of outgoing messages;

(c) upon receipt of a call from a caller, determining whether a day in which the call is received matches the first date constraint;

(d) if in step (c) the day in which the call is received matches the first date constraint, playing the first outgoing message to the caller; and, (e) if in step (c) the day in which of the call is received does not match the first date constraint, playing an outgoing message other than the first outgoing message to the caller.

2. A method as in claim 1 wherein in step (f) the first date constraint includes at least one of the following constraints:

an indication of year;

an indication of month;

an indication of day of the month; and, an indication of day of the week.

3. A device for handling incoming phone calls, the device comprising:

a memory used for holding a plurality of outgoing messages;

associating means for associating a first date constraint with a first outgoing message from the plurality of outgoing messages;

comparing means for, upon receipt of a call from a caller, determining whether a day in which the call is received matches the first date constraint; and, a user interface for playing the first outgoing message to the caller when the day in which the call is received matches the first date constraint, and for playing an outgoing message other than the first outgoing message when the day in which the call is received does not match the first date constraint.

4. A device as in claim 3 wherein the first time constraint includes at least one of the following constraints:

an indication of year;

an indication of month;

an indication of day of the month; and an indication of day of the week.

5. Storage media for storing a program which when run on a computing system implements a method for handling incoming phone calls, the method comprising the following steps:

(a) storing a plurality of outgoing messages;

(b) associating a first date constraint with a first outgoing message from the plurality of outgoing messages;

(c) upon receipt of a call from a caller, determining whether a day in which the call is received matches the first date constraint;

(d) if in step (c) the day in which the call is received matches the first date constraint, playing the first outgoing message to the caller; and, (e) if in step (c) the day in which the call is received does not match the first date constraint, playing an outgoing message other than the first outgoing message to the caller.

6. A method for handling incoming phone calls, comprising the following steps:

(a) storing a plurality of outgoing messages;

(b) associating a first caller identification with a first outgoing message from the plurality of outgoing messages, wherein the first caller identification comprises a voice print from a first potential caller;

(c) upon receipt of a call from a caller, performing passive identification of the caller in order to determine if an identity of the caller matches the first caller identification;

(d) if in step (c) an identity of the caller matches the first caller identification, playing the first outgoing message to the caller; and, (e) if in step (c) an identity of the caller does not match the first caller identification, playing an outgoing message other than the first outgoing message to the caller.

7. A method for handling incoming phone calls, comprising the following steps:

(a) storing a plurality of outgoing messages;

(b) associating a first caller identification with a first outgoing message from the plurality of outgoing messages;

(c) upon receipt of a call from a caller, performing passive identification of the caller in order to determine if an identity of the caller matches the first caller identification;

(d) if in step (c) an identity of the caller matches the first caller identification, playing the first outgoing message to the caller;

(e) if in step (c) an identity of the caller does not match the first caller identification, playing an outgoing message other than the first outgoing message to the caller;

(f) associating a first chronology constraint with a second outgoing message from the plurality of outgoing messages;

(g) upon receipt of the call from the caller, determining whether a time of the call matches the first chronology constraint;

(h) if in step (c) the identity of the caller does not match the first caller identification and in step (g) the time of the call matches the first chronology constraint, playing the second outgoing message to the caller; and, (i) if in step (c) the identity of the caller does not match the first caller identification and in step (g) the time of the call does not match the first chronology constraint, playing an outgoing message other than the first outgoing message and other than the second outgoing message to the caller.

8. A method as in claim 7 wherein in step (f) the first chronology constraint includes at least one of the following constraints:

an indication of year;

an indication of month;

an indication of day of the month;

an indication of day of the week;

an indication of hours; and, an indication of minutes.

9. A device for handling incoming phone calls, the device comprising:

a memory used for storing a plurality of outgoing messages;

associating means for associating a first caller identification with a first outgoing message from the plurality of outgoing messages, wherein the first caller identification comprises a voice print from a first potential caller;

comparing means for, upon receipt of a call from a caller, performing passive identification of the caller in order to determine if an identity of the caller matches the first caller identification; and, a user interface for playing the first outgoing message to the caller when an identity of the caller matches the first caller identification, and for playing an outgoing message other than the first outgoing message to the caller when an identity of the caller does not match the first caller identification.

10. A device for handling incoming phone calls, the device comprising:

a memory used for storing a plurality of outgoing messages;

associating means for associating a first caller identification with a first outgoing message from the plurality of outgoing messages;

comparing means for, upon receipt of a call from a caller, performing passive identification of the caller in order to determine if an identity of the caller matches the first caller identification; and, a user interface for playing the first outgoing message to the caller when an identity of the caller matches the first caller identification, and for playing an outgoing message other than the first outgoing message to the caller when an identity of the caller does not match the first caller identification; wherein:

the associating means is additionally for associating a first chronology constraint with a second outgoing message from the plurality of outgoing messages;

the comparing means is for, upon receipt of the call from the caller, determining whether a time of the call matches the first chronology constraint; and, the user interface is additionally for playing the second outgoing message to the caller when the identity of the caller does not match the first caller identification and the time of the call matches the first chronology constraint, and is for playing an outgoing message other than the first outgoing message and other than the second outgoing message to the caller when the identity of the caller does not match the first caller identification and the time of the call does not match the first chronology constraint.

11. A device as in claim 10 wherein the first chronology constraint includes at least one of the following constraints:
- an indication of year;
- an indication of month;
- an indication of day of the month;
- an indication of day of the week;
- an indication of hours; and,
- an indication of minutes.

12. Storage media for storing a program which when run on a computing system implements a method for handling incoming phone calls, the method comprising the following steps:

(a) storing a plurality of outgoing messages;

(b) associating a first caller identification with a first outgoing message from the plurality of outgoing messages, wherein the first caller identification comprises a voice print from a first potential caller;

(c) upon receipt of a call from a caller, performing passive identification of the caller in order to determine if an identity of the caller matches the first caller identification;

(d) if in step (c) an identity of the caller matches the first caller identification, playing the first outgoing message to the caller; and, (e) if in step (c) an identity of the caller does not match the first caller identification, playing an outgoing message other than the first outgoing message to the caller.

13. Storage media for storing a program which when run on a computing system implements a method for handling incoming phone calls, the method comprising the following steps:

(a) storing a plurality of outgoing messages;

(b) associating a first caller identification with a first outgoing message from the plurality of outgoing messages;

(c) upon receipt of a call from a caller, performing passive identification of the caller in order to determine if an identity of the caller matches the first caller identification;

(d) if in step (c) an identity of the caller matches the first caller identification, playing the first outgoing message to the caller;

(e) if in step (c) an identity of the caller does not match the first caller identification, playing an outgoing message other than the first outgoing message to the caller;

(f) associating a first chronology constraint with a second outgoing message from the plurality of outgoing messages;

(g) upon receipt of the call from the caller, determining whether a time of the call matches the first chronology constraint;

(h) if in step (c) the identity of the caller does not match the first caller identification and in step (g) the time of the call matches the first chronology constraint, playing the second outgoing message to the caller; and, (i) if in step (c) the identity of the caller does not match the first caller identification and in step (g) the time of the call does not match the first chronology constraint, playing an outgoing message other than the first outgoing message and other than the second outgoing message to the caller.

14. Storage media as in claim 13 wherein in step (f) the first chronology constraint includes at least one of the following constraints:
- an indication of year;
- an indication of month;
- an indication of day of the month;
- an indication of day of the week;
- an indication of hours; and,
- an indication of minutes.

* * * * *